(12) United States Patent
Su et al.

(10) Patent No.: US 11,698,494 B2
(45) Date of Patent: Jul. 11, 2023

(54) MINIATURIZED INTEGRATED FREQUENCY LOCKED OPTICAL WHISPERING EVANESCENT RESONATOR DEVICES

(71) Applicant: Arizona Board of Regents on Behalf of the University of Arizona, Tucson, AZ (US)

(72) Inventors: Judith Su, Tucson, AZ (US); Shuang Hao, Tucson, AZ (US); Gwangho Choi, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 94 days.

(21) Appl. No.: 17/430,218

(22) PCT Filed: Feb. 11, 2020

(86) PCT No.: PCT/US2020/017678
§ 371 (c)(1),
(2) Date: Aug. 11, 2021

(87) PCT Pub. No.: WO2020/167776
PCT Pub. Date: Aug. 20, 2020

(65) Prior Publication Data
US 2022/0163724 A1 May 26, 2022

Related U.S. Application Data

(60) Provisional application No. 62/804,028, filed on Feb. 11, 2019.

(51) Int. Cl.
*G02B 6/293* (2006.01)
*G01N 21/77* (2006.01)

(52) U.S. Cl.
CPC ..... *G02B 6/29341* (2013.01); *G01N 21/7746* (2013.01)

(58) Field of Classification Search
CPC ................. G02B 6/29341; G01N 21/7746
See application file for complete search history.

(56) References Cited

U.S. PATENT DOCUMENTS 9,700,888 B1 7/2017 Lee et al.
9,739,770 B2 8/2017 Su
(Continued)

FOREIGN PATENT DOCUMENTS

CN         104214082     12/2014
WO     2018/005044 A1   1/2018

OTHER PUBLICATIONS

Liu et al., "Whispering gallery mode microresonator for nonlinear optics", ARXiV Pre-Print, (Sep. 13, 2018), Retrieved from the Internet: <URL:https://arxiv.org/labs/1809.04878>: Figures 6A-7; section 3.4.2, p. 16, paragraph 1-p. 18, paragraph 3.

*Primary Examiner* — John Bedtelyon
(74) *Attorney, Agent, or Firm* — Venable LLP; Henry J. Daley

(57) ABSTRACT

A miniaturized integrated frequency locked optical whispering evanescent resonator comprises: an optical source; an optical path having a first end and a second end, the optical path coupled to the optical source at the first end; an optical resonator disposed along a side of the optical path between the first and second ends, the optical resonator coupled to the optical path through an evanescent field to excite an optical whispering-gallery mode; an optical receiver coupled to the second end of the optical path; and a digital data processor configured to communicate with the optical receiver and the optical source, wherein the digital data processor comprises a frequency locking system and a data acquisition system, wherein the frequency locking system tunes the frequency of (Continued)

the optical source to the optical whispering-gallery mode of the optical resonator, and wherein the resonator weighs less than 15 kg and is containable within a volume less than 30 liters.

20 Claims, 3 Drawing Sheets

(56) References Cited

U.S. PATENT DOCUMENTS

| | | |
|---|---|---|
| 11,378,516 B2 * | 7/2022 | Su .................. G01N 21/6486 |
| 2017/0322207 A1 | 11/2017 | Su |
| 2018/0005044 A1 | 1/2018 | Olson |
| 2022/0050043 A1 * | 2/2022 | Ozdemir ............ G01N 15/1456 |
| 2022/0350082 A1 * | 11/2022 | Yang .................. G01H 9/004 |

* cited by examiner

MINIATURIZED INTEGRATED FREQUENCY LOCKED OPTICAL WHISPERING EVANESCENT RESONATOR DEVICES

CROSS-REFERENCE OF RELATED APPLICATIONS

This application is a National Stage Application under 35 U.S.C. § 371 of PCT/US2020/017678, filed Feb. 11, 2020, which claims priority to U.S. Provisional Application No. 62/804,028 filed Feb. 11, 2019, the entire contents of which are hereby incorporated by reference.

BACKGROUND

1. Technical Field

The field of currently claimed embodiments of this invention relates to optical resonator devices, and more particularly, but not limited to miniaturized, integrated frequency-locked optical whispering evanescent resonator devices.

2. Discussion of Related Art

The current inventors have recently developed a label-free biological and chemical sensing system known as a frequency locked optical whispering evanescent resonator (FLOWER) that integrates microtoroid optical resonators with frequency locking feedback control, which aids the suppression of noise. FLOWER, for example as shown in U.S. Pat. No. 9,739,770, is currently capable of highly sensitive detection down to the single macromolecule level, as demonstrated by label-free detection of single human interleukin-2 (IL-2) molecules. To date, FLOWER has achieved a signal to noise ratio of 5 using an anti-IL-2 antibody layer immobilized on a micro-toroid to specifically capture IL-2. However, the above-noted FLOWER system is relatively large taking up an entire optical bench. Therefore, there remains a need for miniaturized, integrated frequency-locked optical whispering evanescent resonator devices.

SUMMARY

According to some embodiments, a miniaturized integrated frequency locked optical whispering evanescent resonator is provided. The resonator comprises: an optical source; an optical path having a first end and a second end, the optical path arranged to be optically coupled to the optical source at the first end; an optical resonator disposed proximate the optical path along a side of the optical path between the first and second ends, the optical resonator having an optical whispering-gallery mode and being optically coupled to the optical path through an evanescent field to excite the optical whispering-gallery mode; an optical receiver arranged to be optically coupled to the second end of the optical path; and a digital data processor configured to communicate with the optical receiver and the optical source, wherein the digital data processor comprises a frequency locking system and a data acquisition system configured thereon, wherein the frequency locking system controls a frequency of the optical source to be tuned to the optical whispering-gallery mode of the optical resonator, and wherein the miniaturized integrated frequency locked optical whispering evanescent resonator weighs less than 15 kg and is containable within a volume less than 30 liters.

According to some embodiments, the resonator further comprises: an analog-to-digital converter arranged in a communication path between the optical receiver and the digital data processor, and a digital-to-analog converter arranged in a communication path between the digital data processor and the optical source.

According to some embodiments, the analog-to-digital converter is an AD7606 analog-to-digital converter and the digital-to-analog converter is an AD5791 digital-to-analog converter. According to some embodiments, the resonator further comprises a microcontroller in combination with an analog-to-digital converter and a digital-to analog converter. According to some embodiments, the optical source comprises a laser. According to some embodiments, the optical resonator is a microtoroid optical resonator.

According to some embodiments, the optical resonator has a functionalized surface that attaches to a substance to be detected. According to some embodiments, an antibody layer is immobilized on the optical resonator to capture the substance to be detected. According to some embodiments, the substance to be detected comprises single human interleukin-2 molecules.

According to some embodiments, the optical resonator is frequency locked to a resonance frequency of the optical resonator and provides light sufficiently intense to provide four-wave mixing while being coupled with the optical resonator resulting in a comb spectrum received by the optical receiver, and wherein the comb spectrum provides characteristic changes in the presence of a substance in contact with the optical resonator to provide detection and characterization of the substance.

According to some embodiments, the miniaturized integrated frequency locked optical whispering evanescent resonator weighs less than 10 kg and is containable within a volume less than 20 liters. According to some embodiments, the miniaturized integrated frequency locked optical whispering evanescent resonator weighs less than 3 kg and is containable within a volume less than 5 liters. According to some embodiments, the miniaturized integrated frequency locked optical whispering evanescent resonator weighs less than or equal to 2.2 kg and is containable within a volume less than or equal to 4.5 liters.

According to some embodiments, the digital data processor includes a Raspberry Pi. According to some embodiments, the frequency locking system includes a Proportional-Integral-Derivative (PID) controller. According to some embodiments, the digital data processor is a single board computer. According to some embodiments, the digital data processor comprises a microcontroller.

According to some embodiments, the resonator further comprises a polarization coupler arranged to control the polarization of light emitted by the optical source. According to some embodiments, the resonator further comprises a beam splitter arranged to split the light from the optical source which has passed through the polarization coupler.

According to some embodiments the optical receiver comprises a balanced or auto-balanced detector.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "light" is intended to have a broad definition that can include light in the visible as well as non-visible regions of the electromagnetic spectrum. For example, the term "light" can include, but is not limited to, visible, infrared and ultraviolet light. Similarly, the term "optical" has a corresponding broad definition as with the term "light".

The term "optical resonator" means a device in which light can constructively build up at resonant frequencies.

The term "microtoroid optical resonator" means a toroidal shaped optical resonator that has a major length scale between 1-1000 microns.

Some embodiments are directed to a portable Raspberry Pi version of FLOWER (frequency locked optical whispering evanescent resonator). The FLOWER system uses a high-Q microcavity to detect particles. Using frequency locking technology, the FLOWER system can detect the resonance shift caused by the particle binding on the high-Q microtoroid. As the processing center, the Raspberry Pi, which is a card size CPU, acquires the light signal from a balanced or auto-balanced receiver, generates an error signal, and outputs a PID controller signal to drive the laser wavelength. Considering the extreme accuracy requirement for micro- and nanoparticle detection, a high performance data acquisition chip (AD7606) and digital analog converter chip (AD5791) have been found to be suitable in an embodiment of our system. Compared to the previous FLOWER system, the Raspberry Pi version of FLOWER has a better processing capacity and can keep the same accuracy level. In addition, the weight and size of the whole system greatly decreases, making it possible for the FLOWER system to be carried by people or mounted on a drone. Using Bluetooth and Wifi capabilities from the Raspberry Pi, the new FLOWER system can easily connect to the Internet to achieve real-time data sharing and remote control.

Typical Previous FLOWER System

Figure 4:
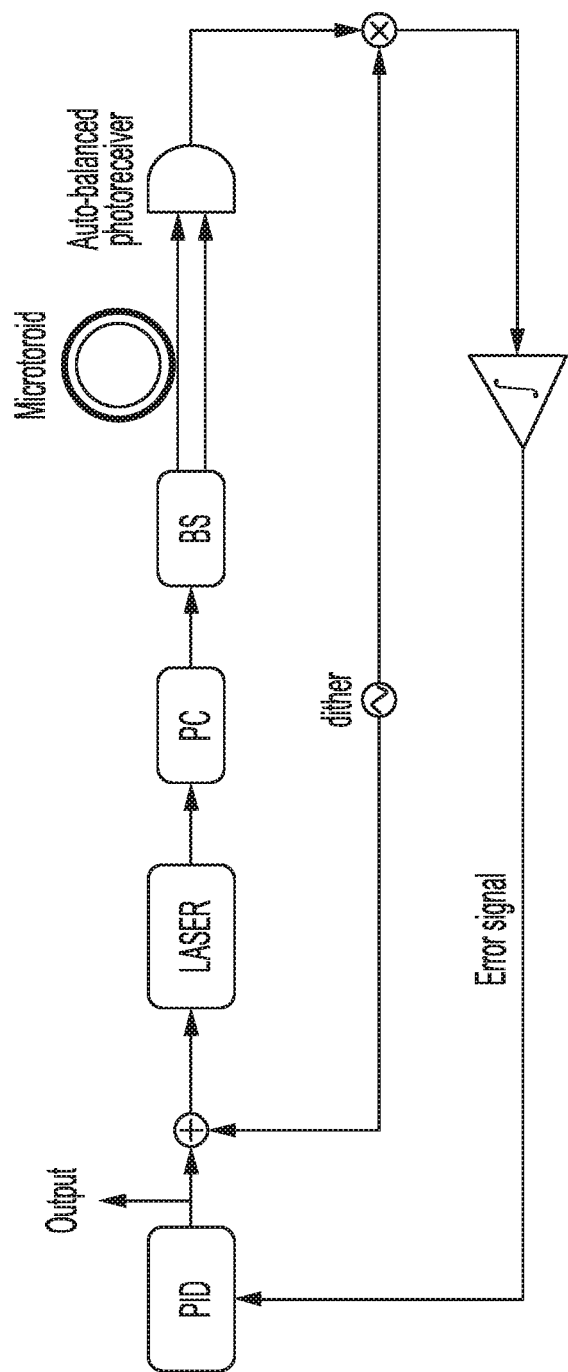
FIG. 4 is a schematic showing an example of a typical FLOWER system.

FIG. 4 illustrates a typical previous FLOWER, which can measure low concentrations of biological and chemical molecules down to the single molecule limit.

FIG. 4 is a schematic showing an example of a typical FLOWER system. A high frequency (2 kHz) dither oscillation signal is used to modulate a continuous wave (CW) laser frequency. A polarization coupler (PC) is used for controlling the polarization of the laser. A 50:50 beam splitter (BS) splits the light. The output of an auto-balanced photoreceiver is multiplied by the dither signal and time averaged to generate an error signal, which is proportional to the difference between the laser wavelength and the resonance frequency of the microcavity. A Proportional-Integral-Derivative (PID) controller sets the laser wavelength to the microtoroid resonance according to the received error signal.

In the typical FLOWER system, we use the Pound-Drever-Hall method to generate an error signal which is proportional to the difference between the laser wavelength and microtoroid resonance. A PID controller, which is widely used in control loop feedback systems, continuously calculates the error signal and outputs a control signal which drives the laser wavelength to decrease the error signal to zero. By forcing the error signal to zero, the laser wavelength can be locked to the microtoroid resonance and the resonance information is recorded by a data acquisition card. A beam splitter splits the laser into signal light through the microtoroid and reference light. The auto-balanced receiver can remove most of the common noise from the signal light and reference light. In this way, the laser jitter noise, laser wavelength and power instability noise can decrease at least 60 dB.

Although FLOWER is able to sense low concentrations of molecules, it occupies a large footprint and currently fits on a 4'×6' optical table in the lab. There is currently a need for miniaturizing FLOWER and making it light weight and portable. To do this, according to some examples, there is provided a Raspberry Pi enabled version of FLOWER. Light weight and portable systems other than based on a Raspberry Pi according to embodiments of the current invention are also contemplated.

Figure 1:
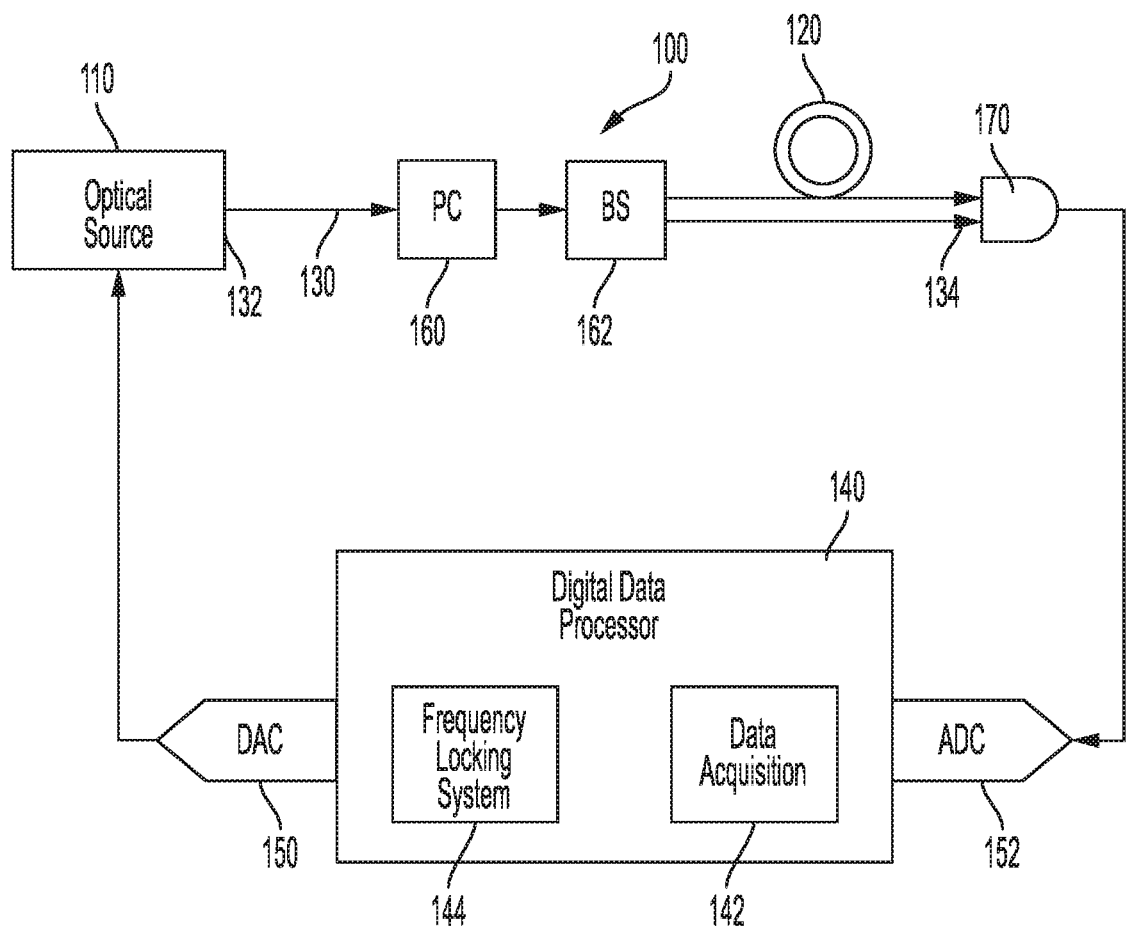
FIG. 1 is a schematic of a miniaturized integrated frequency locked optical whispering evanescent resonator according to some embodiments.

FIG. 1 is a schematic of a miniaturized integrated frequency locked optical whispering evanescent resonator 100, or resonator system 100, for short, according to some embodiments of the current invention. The resonator system 100 may include an optical source 110, an optical resonator 120, an optical path 130, an optical receiver 170 and a digital data processor 140.

The optical source 110 may be a laser, or a light emitting diode, for example. The optical source 110 emits light, either visible or non-visible. The optical path 130 has a first end 132 and a second end 134. The optical path 130 is arranged to be optically coupled to the optical source 110 at the first end 132.

The optical resonator 120 may be disposed proximate the optical path 130 along a side of the optical path 130 between the first end 132 and the second end 134. The optical resonator 120 may have an optical whispering-gallery mode. In this case the optical resonator 120 may be optically coupled to the optical path 130 through an evanescent field to excite the optical whispering-gallery mode. According to some embodiments the optical resonator 120 may be a microtoroid optical resonator, or a microspherical optical resonator, for example.

The optical receiver 170 may be arranged to be optically coupled to the second end 134 of the optical path 130. The optical receiver 170 is sensitive to light at wavelengths emitted by the optical source 110. The optical receiver 170 may be, for example, a balanced or auto-balanced detector.

The resonator system 100 may further include optics within the optical path 130. For example, the resonator system 100 may include a polarization coupler (PC) 160 to control the polarization of the optical source 110. The optics may further include a 50:50 beam splitter (BS) 162, which splits the light from the optical source 110, where such light has passed through the polarization coupler 160.

The digital data processor 140 may be configured to communicate with the optical receiver 170 and the optical source 110. The digital data processor 140 comprises a frequency locking system 144 and a data acquisition system 142 configured on the digital data processor 140. The frequency locking system 144 controls a frequency of the optical source 110 to be tuned to the optical whispering-gallery mode of the optical resonator 120. The digital data processor 140 may be a microcontroller, for example. The frequency locking system 144 may include a PID controller, for example. The digital data processor 140 may be a single board computer, for example.

In operation, the optical resonator 120 may be frequency locked to a resonance frequency of the optical resonator 120 and provide light sufficiently intense to provide four-wave mixing while being coupled with the optical resonator 120 resulting in a comb spectrum received by the optical receiver 170. The comb spectrum provides characteristic changes in the presence of a substance in contact with the optical resonator 120 to provide detection and characterization of the substance.

The resonator system 100 may be of a relatively small size and weight. For example, the resonator system 100 may weigh less than 15 kg and may be containable within a volume less than 30 liters. More preferably, the resonator system 100 may weigh less than 10 kg and may be containable within a volume less than 20 liters. Still more preferably, the resonator system 100 may weigh less than 3 kg and may be containable within a volume less than 5 liters. Still more preferably, the resonator system 100 may weigh less than 2.2 kg and may be containable within a volume less than 4.5 liters.

The resonator system 100 may further include a digital-to-analog converter (DAC) 150 and an analog-to-digital converter (ADC) 152. The ADC 152 may be arranged in a communication path between the optical receiver 110 and the digital data processor 140. The ADC 152 converts analog signals from the optical receiver 110 into digital signals. The DAC 150 may be arranged in a communication path between the digital data processor 140 and the optical source 110. The DAC 150 converts digital signals from the digital data processor 140 to analog signls to control the optical receiver 110, such as to control the optical receiver 110 to be tuned to a desired emission wavelength. The ADC 152 may be an AD7606 ADC, for example. The DAC 150 may be an AD5791 DAC, for example.

The digital data processor 140 may, in some embodiments include a microcontroller, in combination with in combination with the ADC 152 and DAC 150.

The optical resonator 120, according to some embodiments, may have a functionalized surface that attaches to a substance to be detected. For example, an antibody layer may be immobilized on the optical resonator 120 to capture the substance to be detected.

EXAMPLES

The following describes some embodiments of the current invention in more detail according to examples.

Figure 2:
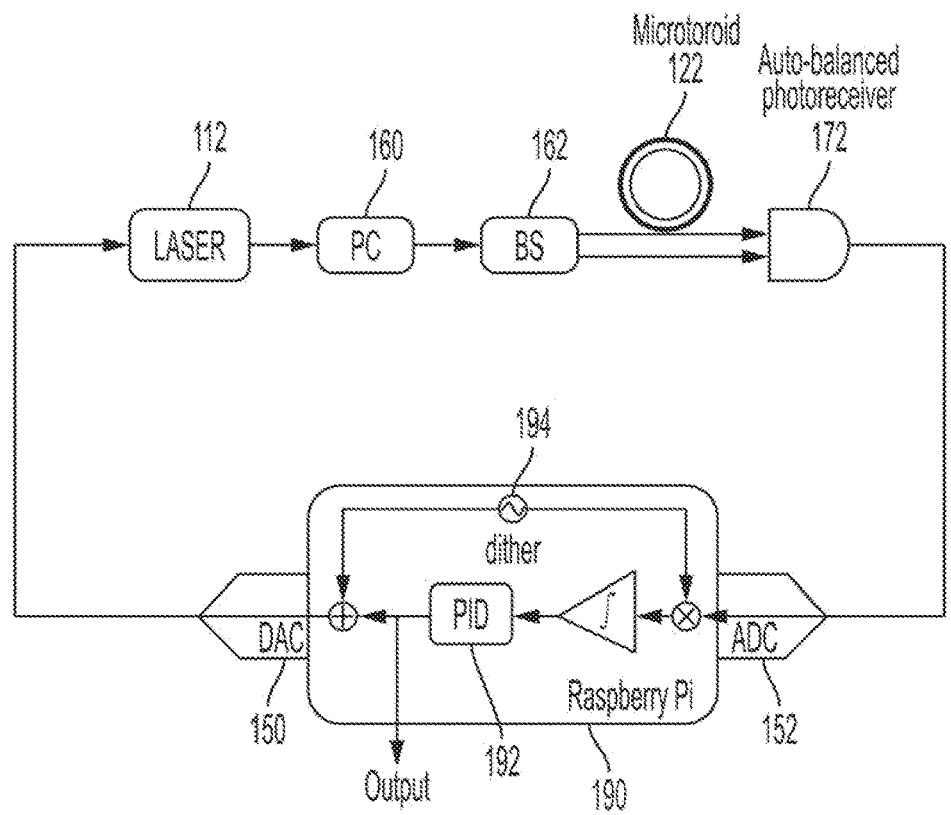
FIG. 2 is a schematic of an integrated FLOWER system according so some embodiments.

FIG. 2 illustrates an example of the resonator system 100 employing a Raspberry Pi 190 as the digital data processor 140, a laser 112 as the optical source 110, a balanced or auto-balanced detector 172 as the optical receiver 170, and a microtoroid resonator 122 as the optical resonator 120.

As a data processing center, the Raspberry Pi (card-sized mini-computer) generates the dither signal 194 and time-averages the receiver signal to calculate the error signal for PID controller 192. The Raspberry Pi 190 only processes the digital signal. The FIG. 2 system further includes an ADC 152 and a DAC 150 to convert the signal type to fit the Raspberry Pi 190. According to the sample rate and resolution and noise from our numerical simulations, the ADC 152 used may be implemented by an AD7606, while the DAC 150 may be implemented by an AD5791, for example.

The Raspberry Pi is a small single-board computer which uses the Linux operating system. The Raspberry PI 3 Mode B+ is used as the data processing center in the integrated FLOWER system. However, the general concepts of embodiments of the current invention are not limited to only the use of a Raspberry Pi computer. Other and/or future developed compact, lightweight single-board computers can be used in other embodiments as the digital data processor 140. The Raspberry Pi has a good calculation capacity and can wirelessly connect to personal computers and mobile devices, thus enabling it to be used for a wide variety of applications such as monitoring temperature, humidity and pollution.

In the example of FIG. 2, as compared to the old FLOWER system, the commercial frequency locking system (Toptica DigiLock 110) and data acquisition systems are replaced with a Raspberry Pi. In this way, we greatly reduce the size and the weight of the FLOWER system, making it possible for the FLOWER system to be carried by people or mounted on a drone. The system according to some embodiments of the invention has a weight that is less than or equal to 15 kg, and is containable within a volume that is less than or equal to 30 L. The system according to some embodiments has a weight that is less than or equal to 10 kg, and is containable within a volume that is less than or equal to 20 L. The system according to some embodiments has a weight that is less than or equal to 3 kg, and is containable within a volume that is less than or equal to 5 L. The system according to some embodiments has a weight of about 2.2 kg, and is containable within a volume of about 4.5 L. By using the suitable DAC 150 and ADC 152 to transmit and receive signals, the system noise, accuracy, and processing speed can be kept at the same level as in the previous FLOWER system. Through Bluetooth or Wi-Fi, the Raspberry Pi can wirelessly connect to the Internet or other mobile devices to achieve real-time data sharing and remote control.

In the old FLOWER system, the DigiLock and the data acquisition device uses a stable power voltage and constant temperature to maintain the DAC and ADC chips' high resolution and ultralow noise. The power requirements and cooling fan limits system miniaturization. For the Raspberry Pi FLOWER system, we replaced the DigiLock and data acquisition device with the Raspberry Pi. We chose a high-resolution and high-speed DAC (AD5791) and ADC (AD7606) board. The AD5791 may be at least a 20-bit DAC chip, for example, while the AD7606 may be at least a 16-bit ADC chip, for example.

An Arduino may be used to improve the communication problem between the Raspberry Pi and the high-speed DAC and ADC. The Raspberry Pi and Arduino do not generate much heat and can support the DAC and ADC chips' high resolution as a power source. In this way, it greatly reduces the size and the weight of the FLOWER system, making it possible for the FLOWER system to be carried by people or mounted on a drone. Through Bluetooth or Wi-Fi, the Raspberry Pi can wirelessly connect to the Internet or other mobile devices to achieve real-time data sharing and remote control.

Since the Raspberry Pi is not designed for data acquisition, a system with the Raspberry Pi alone may not provide enough reliability, and it must run its own operating system unlike a microcontroller. Thus, in some embodiments an Arduino (microcontroller) may be added to the system to acquire or generate data with an improved reliable accuracy. The Arduino showed a three times faster data transfer rate. The minimum required sample rate for the DAC is 100 ksps.

Figure 3:
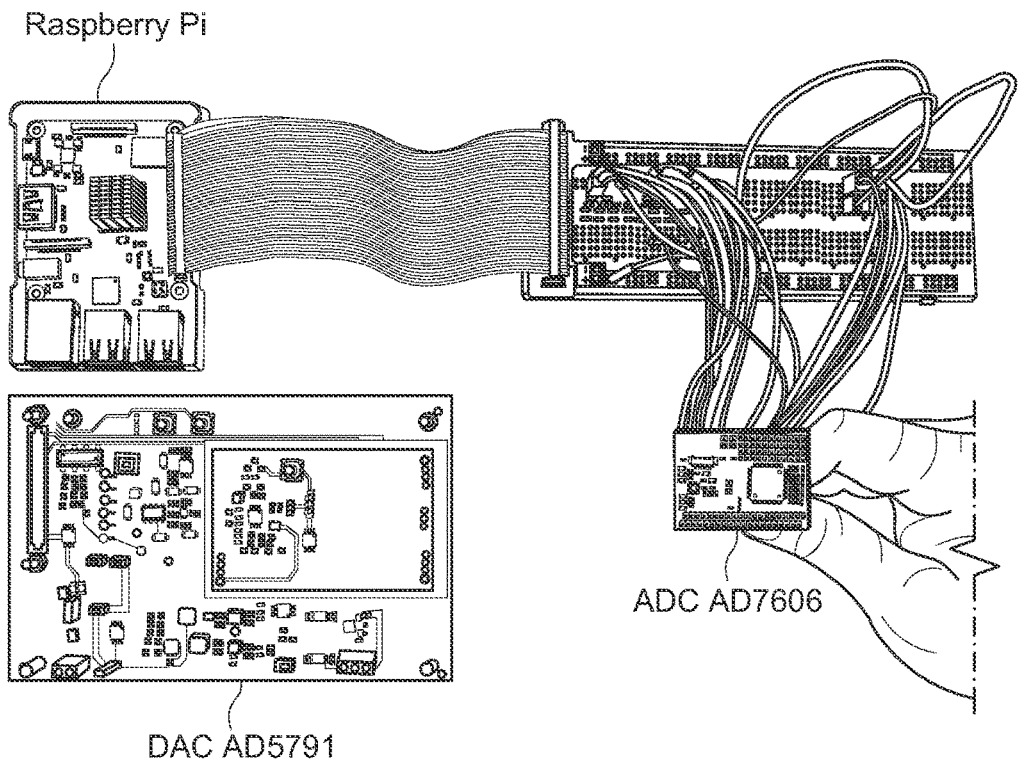
FIG. 3 illustrates a photograph of a FLOWER system with a Raspberry Pi to provide an idea of its size.

FIG. 3 illustrates a photograph of a FLOWER system with a Raspberry Pi to provide an idea of its size.

Some advantages of some embodiments of the current invention can include, but are not limited to, the following: The size, weight, and cost of the FLOWER system is greatly decreased. Further, the system may be used, in some embodiments, in a wireless network connection which enables the sending of data from remote locations such as on drones or on submarines.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A miniaturized integrated frequency locked optical whispering evanescent resonator, comprising:
    an optical source;
    an optical path having a first end and a second end, said optical path arranged to be optically coupled to said optical source at said first end;
    an optical resonator disposed proximate said optical path along a side of said optical path between said first and second ends, said optical resonator having an optical whispering-gallery mode and being optically coupled to said optical path through an evanescent field to excite said optical whispering-gallery mode;
    an optical receiver arranged to be optically coupled to said second end of said optical path; and
    a digital data processor configured to communicate with said optical receiver and said optical source,
    wherein said digital data processor comprises a frequency locking system and a data acquisition system configured thereon,
    wherein said frequency locking system controls a frequency of said optical source to be tuned to said optical whispering-gallery mode of said optical resonator, and
    wherein the frequency locking system and the data acquisition system are implemented in a miniature sized single-board computer such that said miniaturized integrated frequency locked optical whispering evanescent resonator weighs less than 15 kg and is containable within a volume less than 30 liters.

2. The miniaturized integrated frequency locked optical whispering evanescent resonator according to claim 1, further comprising:
    an analog-to-digital converter arranged in a communication path between said optical receiver and said digital data processor, and
    a digital-to-analog converter arranged in a communication path between said digital data processor and said optical source.

3. The miniaturized integrated frequency locked optical whispering evanescent resonator according to claim 2, wherein said analog-to-digital converter is an AD7606 analog-to-digital converter and said digital-to-analog converter is an AD5791 digital-to-analog converter.

4. The miniaturized integrated frequency locked optical evanescent resonator according to claim 1, further comprising a microcontroller in combination with an analog-to-digital converter and a digital-to analog converter.

5. The miniaturized integrated frequency locked optical whispering evanescent resonator according to claim 1, wherein said optical source comprises a laser.

6. The miniaturized integrated frequency locked optical whispering evanescent resonator according to claim 1, wherein said optical resonator is a microtoroid optical resonator.

7. The miniaturized integrated frequency locked optical whispering evanescent resonator according to claim 1, wherein said optical resonator has a functionalized surface that attaches to a substance to be detected.

8. The miniaturized integrated frequency locked optical whispering evanescent resonator according to claim 7, wherein an antibody layer is immobilized on said optical resonator to capture said substance to be detected.

9. The miniaturized integrated frequency locked optical whispering evanescent resonator according to claim 7, wherein said substance to be detected comprises single human interleukin-2 molecules.

10. The miniaturized integrated frequency locked optical whispering evanescent resonator according to claim 1, wherein said optical resonator is frequency locked to a resonance frequency of said optical resonator and provides light sufficiently intense to provide four-wave mixing while being coupled with said optical resonator resulting in a comb spectrum received by said optical receiver, and
    wherein said comb spectrum provides characteristic changes in the presence of a substance in contact with said optical resonator to provide detection and characterization of said substance.

11. The miniaturized integrated frequency locked optical whispering evanescent resonator according to claim 1, wherein said miniaturized integrated frequency locked optical whispering evanescent resonator weighs less than 10 kg and is containable within a volume less than 20 liters.

12. The miniaturized integrated frequency locked optical whispering evanescent resonator according to claim 1, wherein said miniaturized integrated frequency locked optical whispering evanescent resonator weighs less than 3 kg and is containable within a volume less than 5 liters.

13. The miniaturized integrated frequency locked optical whispering evanescent resonator according to claim 1, wherein said miniaturized integrated frequency locked optical whispering evanescent resonator weighs less than or equal to 2.2 kg and is containable within a volume less than or equal to 4.5 liters.

14. The miniaturized integrated frequency locked optical whispering evanescent resonator according to claim 1, wherein the digital data processor includes the miniature sized single-board computer.

15. The miniaturized integrated frequency locked optical whispering evanescent resonator according to claim 1, wherein the frequency locking system includes a Proportional-Integral-Derivative (PID) controller.

16. The miniaturized integrated frequency locked optical whispering evanescent resonator according to claim 1, wherein the digital data processor is a single board computer.

17. The miniaturized integrated frequency locked optical whispering evanescent resonator according to claim 1, wherein the digital data processor comprises a microcontroller.

18. The miniaturized integrated frequency locked optical whispering evanescent resonator according to claim 1, further comprising a polarization coupler arranged to control the polarization of light emitted by the optical source.

19. The miniaturized integrated frequency locked optical whispering evanescent resonator according to claim 18, further comprising a beam splitter arranged to split the light from the optical source which has passed through the polarization coupler.

20. The miniaturized integrated frequency locked optical whispering evanescent resonator according to claim 1, wherein the optical receiver comprises a balanced or auto-balanced detector.

* * * * *